United States Patent

VanDahm et al.

(10) Patent No.: US 6,372,031 B1
(45) Date of Patent: *Apr. 16, 2002

(54) WASHABLE COLORING COMPOSITIONS COMPRISING LOW MOLECULAR-WEIGHT STYRENE-MALEIC ANHYDRIDE COPOLYMERS

(75) Inventors: Richard A. VanDahm, Spartanburg; Michael A. Valenti, Greenville, both of SC (US)

(73) Assignee: Milliken & Company, Spartanburg, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/366,607

(22) Filed: Aug. 3, 1999

(51) Int. Cl.[7] .................. C09D 11/00; C08L 25/08; C08L 33/02
(52) U.S. Cl. .............. 106/31.64; 524/502; 524/556; 524/577; 525/55; 106/31.09; 106/31.86
(58) Field of Search ................ 524/549, 556, 524/577, 502; 106/31.25, 31.09, 31.64, 31.86; 525/55

(56) References Cited

U.S. PATENT DOCUMENTS

| 3,449,319 A | * | 6/1969 | Kuhn | 260/207.5 |
|---|---|---|---|---|
| 5,043,013 A | | 8/1991 | Kluger et al. | 106/22 |
| 5,116,410 A | | 5/1992 | Miller | 106/22 |
| 5,184,148 A | * | 2/1993 | Suga et al. | 346/1.1 |
| 5,631,309 A | * | 5/1997 | Yanagi et al. | 523/160 |

FOREIGN PATENT DOCUMENTS

| EP | 0557115 A1 | | 8/1993 | |
|---|---|---|---|---|
| EP | 767225 | * | 4/1997 | 523/161 |
| WO | 98/36032 | | 8/1998 | |

* cited by examiner

Primary Examiner—David W. Wu
Assistant Examiner—Kelechi C. Egwim
(74) Attorney, Agent, or Firm—Terry T. Moyer; William S. Parks

(57) ABSTRACT

This invention relates to washable coloring compositions comprising specific low-molecular weight styrene-maleic anydride copolymers. Such copolymers provide excellent washability enhancing performance in association with colorants and inks. Also, these specific compounds exhibit low viscosities which allow for greater amounts of washability enhancing copolymers to be added within colorant and ink formulations while simultaneously permitting the retention of sufficiently low overall viscosities of the target compositions. Such copolymers provide highly effective prevention of permanent colorations to certain substrates, such as skin, clothing, and the like, by the inks, dyes, and the like, within the target compositions. Marker styluses, writing implements, and other colorant transfer devices, containing these inventive compositions, are also encompassed within this invention.

9 Claims, No Drawings

WASHABLE COLORING COMPOSITIONS COMPRISING LOW MOLECULAR-WEIGHT STYRENE-MALEIC ANHYDRIDE COPOLYMERS

FIELD OF THE INVENTION

This invention relates to washable coloring compositions comprising specific low-molecular weight stryrene-maleic anhydride copolymers. Such copolymers provide excellent washability enhancing performance in association with colorants and inks. Also, these specific compounds exhibit low viscosities which allow for greater amounts of washability enhancing copolymers to be added within colorant and ink formulations while simultaneously permitting the retention of sufficiently low overall viscosities of the target compositions. Such copolymers provide highly effective prevention of permanent colorations to certain substrates, such as skin, clothing, and the like, by the inks, dyes, and the like, within the target compositions. Marker styluses, writing implements, and other colorant transfer devices, containing these inventive compositions, are also encompassed within this invention.

DISCUSSION OF THE PRIOR ART

All U.S. and foreign patents cited within this specification are hereby incorporated by reference. The term "washable coloring composition" in conjunction with this invention is intended to encompass marker compositions (such as large childrens' markers and slimmer felt-tip pens, as merely examples), paints, spray-pattern indicators, and other colored compositions which can be removed from certain surfaces through contact with water and/or with detergents.

Washable coloring compositions, such as within ink markers, were developed in the past in order to provide children with writing and/or coloring implements which may not permanently stain or discolor certain surfaces, most notably clothing and skin. Such washable ink marker compositions generally require water-soluble colorants which also have a low affinity for coloring skin, clothing, and other surfaces, but which exhibit much higher affinity for coloring paper substrates. Although water-soluble polymeric colorants are preferred, acid dyes are also well known color components of such marker compositions.

The washability of such compositions is generally dependent upon the solubility of the colorants or dyes utilized, but such a characteristic can be substantially improved by the presence of certain washability enhancing additives within the marker formulation. Such enhancers are a class of compounds (including polymers) which enhance washability and removal of the colorants from undesirable surfaces. Without intending to be bound by any scientific theory, it is believed that these enhancers function by either reacting with potential "stain sites" on the substrate before the colorant or ink, or complexing with the colorant at its reactive sites, thereby preventing the reaction of the substrate with the highly reactive sites of the colorant. In the past, such compounds have included dye-blocking polyaromatic sulfonates and their salts, such as described in U.S. Pat. No. 5,116,410 to Miller, European Patent Application No. 557,115 A1 to Kaiser et al., and PCT Application No. WO 98/36032 to Santini et al. Such specific dye-blockers have proven somewhat useful in preventing permanent colorations on certain substrates; however, many (such as sulfonated phenol/formaldehyde condensation products) are highly colored and as such tend to have an adverse effect on the brightness of some shades of the target marker composition, producing a shade with a dull, dirty appearance. This problem is particularly noticeable with regard to lighter color shades. As a result, it has proven difficult to produce certain colored markers without requiring extra amounts of colorant, etc., to compensate for the interference from the dye-blocker compounds. Furthermore, many of the prior art dye-blocker compounds possess very high viscosities which, when incorporated within standard ink markers, translate into higher overall viscosities for those target formulations. Such marker compositions generally must exhibit a viscosity of below about 7.0 centipoise in order to function properly and permit adequate flow of the colorant composition through the marker nib of the stylus. In order to adjust the viscosity, it has been necessary to reduce the amount of dye-blocker compound present in the target composition, which, in turn, translates into a less effective washable marker composition. The greater amount of dye-blocker compound, the greater the ability to prevent discolorations of certain substrates. Thus, there is a need to provide a washability enhancing agent within washable marker formulations which can be utilized in high proportions and which does not deleteriously increase the viscosity of the target composition.

Furthermore, the great amount of prior art dye-blocker compounds within target marker compositions has limited the use of such compositions to those stored within relatively large marker styluses (such as childrens' markers). A washability enhancing compound which can be utilized in relatively high proportions to permit increased washability while simultaneously not deleteriously increasing the intrinsic viscosity of the target composition would provide a heretofore unknown advantage within the washable coloring composition art.

DESCRIPTION OF THE INVENTION

It is thus an object of the invention to provide a washability enhancing compound of low molecular weight and low viscosity which is compatible with inks, colorants, dyes, and the like. It is another object of this invention to provide a washability enhancing compound which can be added in very high proportions to a marker composition without increasing the viscosity a deleteriously high amount for standard marker performance. A further object of the invention is to provide a washable marker comprising a marker composition which is easily removed from surfaces such as skin and clothing but exhibits a high affinity for standard writing surfaces, such as paper. Yet another object of this invention is to provide a relatively inexpensive and yet highly effective stain blocker compound for use within washable marker compositions.

The present invention encompasses specific low molecular weight styrene/maleic anhydride copolymers at least a portion of which conform to the following structure (I):

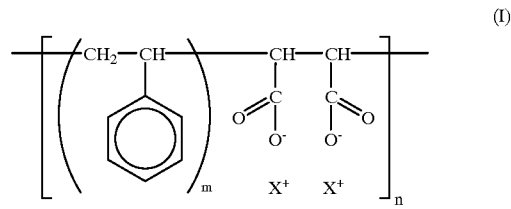

wherein m is from about 1 to about 3, n is from about 6 to about 40, and X is a counter-ion. Such a counter ion may be an alkali metal (such as sodium, potassium, and the like), hydrogen, ammonium, or an amine. The molecular weight of this invention copolymer should be at most about 10,000, preferably from about 800 to about 8,000, and most preferably from about 1,200 to about 1,800. Such a specific copolymer thus must also possess an intrinsic viscosity of from about 1.0 to about 20 centipoise, preferably from about 1.5 to about 16, more preferably from about 1.5 to about 7, and most preferably from about 2 to about 6. Such copolymers, although they may exhibit intrinsic viscosities greater than the target 7.0 centipoise, are generally present with a certain solids content prior to introduction within the target compositions. Upon mixing, the solids are dissolved and the overall viscosity of the resultant composition should be at most about 7.0 (if a marker composition is desired), although the final viscosity may be much higher if other types of washable coloring compositions are desired.

Such a copolymer exhibits an affinity for undesirable writing surfaces (such as skin, clothing, and the like) greater than for other writing surfaces, such as paper (cellulosic-based or otherwise). Furthermore, colorants, dyes, pigments, inks, and the like, appear to exhibit an affinity for this specific type of copolymer which is less than the affinity such compounds exhibit for desirable writing surfaces, such as paper. As a result, this inventive low molecular weight coplymer has proven to be an effective washability enhancing component to prevent permanent colorations (and to facilitate the removal of colorations) from undesirable writing surfaces (again, such as skin, clothing, and the like).

The low molecular weight is necessary in order to provide a low viscosity for the copolymer. In fact, at very high concentrations, the intrinsic viscosity of the inventive copolymer remains rather low, particularly when introduced within a standard marker composition. Thus, greater amounts of such a stain blocker compound may be added to such marker compositions in order to provide increased stain prevention and/or removal, if necessary, without deleteriously increasing the viscosity of the entire marker composition. Such a capability has provided a marked improvement within the washable marker composition field. Additionally, the preferred washability enhancing copolymer does not create a dulling effect within the different color shades produced by the target marker compositions. As such, there is no need for a manufacturer to compensate for any shade or color variations within the inventive washable coloring compositions. Thus, this washability enhancer provides a substantial benefit to the washable coloring composition art.

Stryrene-maleic anhydride copolymers have been taught in the past, notably in U.S. Pat. No. 3,449,319 to Kuhn, however there has never been any discussion as to the importance of the molecular weight versus viscosity for such copolymers. Nor has there been any discussion as to the specific compound as structure (I), above. This U.S. patent does discuss broadly stryene/maleic anhydride copolymers for use as cotton fiber additives during fiber manufacture. Such additives thus facilitate the fugitivity of certain polymeric colorants from the treated fibers upon washing. However, patentee fails to discuss or fairly suggest the utilization of the preferred washability enhancing copolymers, nor does he provide any motivation for altering his own compounds to meet those now claimed or introduce such copolymers within any marker compositions. Thus, a need to provide such an improved copolymer still exists.

Accordingly, this invention encompasses a washable coloring composition comprising at least one coloring agent and further comprising a styrene-maleic anhydride copolymer possessing at most a molecular weight of about 10,000, at least a portion of which is represented by the following structure (I)

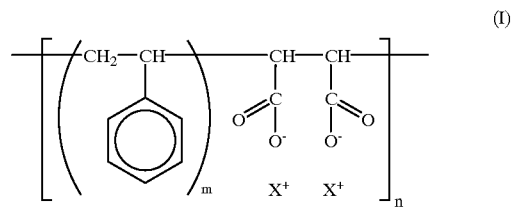

wherein m is from about 1 to about 3, n is from about 6 to about 40, and X is selected from the group consisting of at least one alkali metal, amine, hydrogen, or any mixtures thereof. Preferably, n is from 6 to about 8.

Preferably, the coloring agent of the inventive compositions are selected from colorants, dyes, inks, and the like. Any type of such compounds may be utilized, including, but not limited to, polymeric colorants, such as in U.S. Pat. No. 5,043,013 to Kluger et al, and acid dyes, and the like. Generally, any such compound may be utilized as long as the inventive copolymer exhibits an affinity for undesirable writing surfaces (skin, clothing, etc.) greater than that exhibited by the coloring compound(s) for the same surfaces. Preferably, the coloring compound is a polymeric colorant, possessing a certain amount of polyoxyalkylene groups (such as ethylene oxide, propylene oxide, butylene oxide, glycidol, and the like). Preferably, these colorants have all EO groups, as these are more water-soluble, and thus more fugitive than longer chain groups, although combinations of EO and any of the others may be utilized as well. Preferably from about 2 to about 50 moles of alkyleneoxy groups are present on each separate polyoxyalkylene pendant group; more preferably from about 2 to 10 moles; and most preferably from about 2 to 6 moles. The term "polyoxyalkylene" is intended to encompass any pendant group which includes at least two alkyleneoxy moieties.

The inventive marker compositions also comprise standard components, such as liquid carriers, including, and not limited to, water, lower alcohols (ethanol, methanol, and isopropanol, for example), glycol ethers, alkylene glycols, phenols, and the like. The compositions of this invention may comprise non-aqueous solvents (with no water present) as long as the colorant easily disperses within the solvent (such as ethanol and propylene glycol, as merely examples). Other components include humectants, such as, and not limited to, propylene glycol, glycerin, polyethylene glycol, and the like; film-forming polymer, such as polyvinyl pyrrolidone, polyvinyl acetate, sugars (such as, as merely examples, sorbitol, xylitol, and corn syrup), and the like; surfactants, such as, and not limited to, nonionics, such as ethoxylated dodecanol, anionics, such as phosphates, cationics, such as quaternary ammonium salts, and the like; and preservatives, such as, and not limited to, BHT, glutaraldehyde, formaldehyde, and the like. Such components are generally present in amounts (based upon the entire weight of the total composition) of from about 1 to about 30 percent by weight of at least one colorant, from about 20 to about 90 percent by weight of at least one liquid carrier, from about 5 to about 30 percent by weight of at least one humectant, from about 2 to about 30 percent by weight of at least one film-forming polymer, from about 0.1 to about 1.0 percent by weight of at least one surfactant, and from about 0.1 to about 1.0 percent by weight of at least one preservative. These potentially preferred inventive marker compositions can then be introduced within a marker stylus with a dispensing nib (such as a felt-tip, for example) which is then sealed and ready for use. The inventive compositions may also include other compounds such as, and not limited to, resins, pH adjusters, perfumes, chelating agents (such as EDTA), bactericides, fungicides, stabilizers, and the like. Additionally, polymer additives may be present, such as guar gum, polyethylene oxide, and cyclodextrin.

DESCRIPTION OF THE PREFERRED EMBODIMENT

The preferred styrene-maleic anhydride copolymers within the inventive compositions are commercially available. For example, one preferred styrene/maleic anyhdride-containing copolymer is available form Milliken & Company under the tradename Milliguard® AW (20% solids content), and possesses a molecular weight of about 8,000. A more preferred copolymer is available form Milliken & Company under the tradename Milliguard® LV (20% solids content). Such a copolymer has a molecular weight of about 1,800. Compositions were produced containing these preferred washability enhancing agents as well as comparative mixtures comprising a 120,000 molecular weight styrene-maleic anhydride containing copolymer [available from Monsanto under the tradename Scripset® 700 (30% solids content)] and a control containing no washability enhancer but the same colorant formulation. The mixtures were made in accordance with the following Table 1 and the colorant added was a naphthol-based red azo polyethyleneoxy colorant having 10 moles of ethylene oxide added:

TABLE 1

Marker Compositions Comprising the Inventive and Comparative Washability Enhancers

| Component | Ex. 1(Inventive) | Ex. 2 (Inventive) | Ex. 3 (Comparative) |
|---|---|---|---|
| Colorant | 18 parts | 18 parts | 18 parts |
| Glycerine | 5 parts | 5 parts | 5 parts |
| Water | 55 parts | 55 parts | 55 parts |
| Sorbitol | 10 parts | 10 parts | 10 parts |
| Milliguard ® LV | 12 parts | — | — |
| Milliguard ® AW | — | 7 parts | — |
| Scripset ® 700 | — | — | 1.8 parts |

The viscosities of each composition were measured at 6.0 centipoise (an acceptable viscosity for writing implements). Note that the amounts needed of each copolymer to meet this target viscosity differ significantly. As noted above, a control composition (Example 4) was also produced which comprised the same compositions as above but did not include any washability enhancer compound.

Each composition was then added within separate marker styluses and sealed. The markers were then tested for skin and fabric staining. The skin stain test required the following of the test subject:

1. The subject washed his hands with hand soap and warm water to remove substantially all residual oil and dirt.
2. The subject dried his hands thoroughly first with a towel and then by air drying.
3. The test composition (added to a sealed marker stylus) was then applied through the stylus nib to the palm of the subject's hand. One mark, approximately 2 inches long and ¼ of an inch wide was made for each composition. More colorant composition was applied through repeated drawings on the same line, when necessary, until each composition exhibited the same color intensity.
4. The marks were allowed to dry for one minute and then rinsed under warm water to remove excess color.
5. The subject then washed his hand with soap and warm water for 30 seconds and then rinsed and dried his hand with a towel.
6. The remaining stains (if any) were then evaluated empirically on a scale of one to five both after the water rinse of Step 4 and the soap wash of Step 5.

The rating scale was as follows:

| Rating | Comment |
|---|---|
| 0 | No visible stain |
| 1 | Very slight stain |
| 2 | Slight stain |
| 3 | Moderate stain |
| 4 | Heavy stain |
| 5 | No color removed |

The results are tabulated below as follows:

TABLE 2

Skin Staining Test Results

| Example | Water Rinse | Soap Wash |
|---|---|---|
| 1 | 1 | 0 |
| 2 | 2 | 1 |
| 3 | 3 | 2 |
| 4 | 3 | 2.5 |

Clearly, the low molecular weight washability enhancer performed better than the comparative and control examples. Even with a relatively water-soluble colorant, the difference in stain removal is quite substantial.

The fabric stain test required the following steps to be performed:

1. Test fabrics of 100% cotton and 50/50 polyester/cotton blend were conditioned by washing in hot water (about 140° F.) with the recommended amount of powdered Tide®-brand detergent (Procter & Gamble) and one cup of liquid chlorine bleach. Cold water was used in the rinse cycle. The fabric was then re-washed, without drying, on the hot/cold cycle using 60 grams of Calgon®-brand water softener and dried for between 35 and 40 minutes at 150° F. The test fabric was then cut into 8 inch by 8 inch test swatches.
2. On each of two test swatches, 1 square inch of cloth was saturated with the test marker (sufficiently to discolor a piece of cardboard placed underneath during this coloring procedure).
3. The stained fabric swatches were then allowed to air dry for about 4 hours.
4. The fabric swatches were then rinsed under cool water to remove any excess colorants.
5. The test swatches were then secured to clean towel with safety pins and placed into a washing machine filled with water at 105° F., 1 scoop of Tide®-brand detergent, and a sufficient amount of clean towels to comprise a full load of laundry.
6. The load was then washed in a 14-minute cycle and standard rinse and spin cycles.
7. The swatches were removed both from the machine and their towels and allowed to air dry.
8. The remaining stains (if any) were then evaluated empirically on a scale of one to five both for the cotton and polyester/cotton blend for each example and the control.

The rating scale was as follows:

| Rating | Comment |
|---|---|
| 0 | No visible stain |
| 1 | Very slight stain |
| 2 | Slight stain |
| 3 | Moderate stain |
| 4 | Heavy stain |
| 5 | No color removed |

The results were tabulated as follows:

TABLE 3

Fabric Staining Test Results

| Example | Cotton | Polyester/Cotton Blend |
|---|---|---|
| 1 | 1 | 1 |
| 2 | 1 | 1 |
| 3 | 2 | 2 |
| 4 | 2 | 2 |

Clearly, the low molecular weight washability enhancers performed better than the comparative and control examples. Even with a relatively water-soluble colorant, the difference in stain removal is quite substantial.

The inventive compositions were then tested for skin and fabric staining in comparison with prior art anionic aromatic sulfonate dye-blocker compounds (which produce a noticeable dulling effect within the target colorant compositions, particularly within lighter shades). The colorant tested was Acid Blue 9. The comparative stain blocker was a 50% solution of sodium alkyl diphenyl oxide sulfonate in water (hereinafter called "sulfonate"). The remaining components are noted in the Table below.

TABLE 4

Compositions Comprising the Inventive and Comparative Washabilty Enhancers

| Component | Example 5(Inventive) | Example 6 (Comparative) |
|---|---|---|
| Colorant | 4 parts | 4 parts |
| Water | 75 parts | 75 parts |
| Milliguard ® LV | 25 parts | — |
| Sulfonate | — | 25 parts |

As before, a control (Example 7) was also produced consisting of 4 parts of Acid Blue 9 in 100 parts water. All three compositions were then tested for skin and fabric staining in the same manner as discussed above. The results were as follows:

TABLE 5

Skin and Fabric Staining Test Results

| | Skin | | Fabric | |
|---|---|---|---|---|
| Example | Water | Soap | Cotton | Polyester/Cotton Blend |
| 5 | 1 | 1 | 0 | 0 |
| 6 | 2 | 2 | 0 | 0 |
| 7 | 4 | 4 | 3 | 3 |

Clearly, the inventive coloring compositions performed better or at least the same as the prior art and much better than the control.

There are, of course, many alternative embodiments and modifications of the present invention which are intended to be included within the spirit and scope of the following claims.

What we claim is:

1. A washable coloring composition comprising at least one polymeric colorant and further comprising a styrene-maleic anhydride copolymer possessing at most a molecular weight of about 10,000, at least a portion of which is represented by the following structure (I)

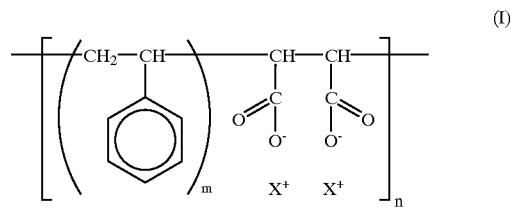

wherein m is from about 1 to about 3, n is from about 6 to about 40, and X is selected from the group consisting of alkali metal, amine, hydrogen, and mixtures thereof.

2. The composition of claim 1 wherein said copolymer is further defined wherein n is from about 6 to about 8, and X is H or sodium.

3. A marker stylus within which is stored the composition of claim 1.

4. A marker stylus within which is stored the composition of claim 2.

5. The composition of claim 1 wherein the molecular weight of said styrene/maleic anhydride-containing copolymer is about 1,800.

6. A washable marker composition comprising a styrene-maleic anhydride copolymer possessing at most a molecular weight of about 10,000, at least a portion of which is represented by the following structure (I)

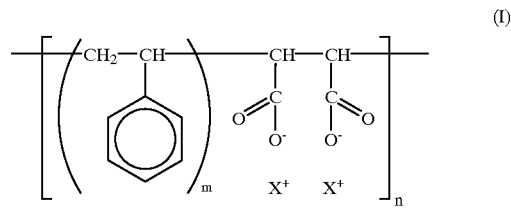

wherein m is from about 1 to about 3, n is from about 6 to about 50, and X is selected from the group consisting of alkali metal, amine, hydrogen, and mixtures thereof, at least one polymeric colorant, at least one liquid carrier, at least one surfactant, at least one preservative, at least one humectant, and at least one film-forming polymer.

7. The composition of claim 6 wherein the molecular weight of said styrene-maleic anhydride-containing copolymer is about 1,800.

8. A marker stylus within which is stored the composition of claim 6.

9. A marker stylus within which is stored the composition of claim 7.

* * * * *